(12) United States Patent
Arora

(10) Patent No.: US 7,864,182 B2
(45) Date of Patent: Jan. 4, 2011

(54) DYNAMIC TILE SIZING IN AN IMAGE PIPELINE

(75) Inventor: Gorav Arora, San Francisco, CA (US)

(73) Assignee: Mediatek Singapore Pte Ltd, Singapore (SG)

( * ) Notice: Subject to any disclaimer, the term of this patent is extended or adjusted under 35 U.S.C. 154(b) by 802 days.

(21) Appl. No.: 11/599,205

(22) Filed: Nov. 13, 2006

(65) Prior Publication Data

US 2008/0111821 A1    May 15, 2008

(51) Int. Cl.
*G06T 1/20* (2006.01)
*H04N 5/225* (2006.01)
*H04N 9/04* (2006.01)
*H04N 5/262* (2006.01)

(52) U.S. Cl. ............. 345/506; 348/207.99; 348/240.99

(58) Field of Classification Search ................. 345/506, 345/660; 348/240.99, 240.1, 240.2, 240.3
See application file for complete search history.

(56) References Cited

U.S. PATENT DOCUMENTS

| | | | |
|---|---|---|---|
| 6,134,606 A * | 10/2000 | Anderson et al. ............. 710/14 |
| 6,621,501 B2 * | 9/2003 | Morrison ..................... 345/660 |
| 7,065,263 B2 * | 6/2006 | Ueda ........................... 382/298 |
| 7,643,675 B2 * | 1/2010 | Evans et al. .................. 382/162 |
| 2002/0135683 A1 * | 9/2002 | Tamama et al. ............. 348/222 |
| 2004/0012563 A1 * | 1/2004 | Papakipos et al. ........... 345/157 |

* cited by examiner

*Primary Examiner*—Kee M Tung
*Assistant Examiner*—Jacinta Crawford
(74) *Attorney, Agent, or Firm*—Imperium Patent Works; T Lester Wallace; Zheng Jin

(57) ABSTRACT

An image pipeline performs image processing operations (for example, Bayer-to-RGB conversion, white balancing, autoexposure, autofocus, color correction, gamma correction, zooming, unsharp masking, mirroring, resizing, color space conversion) on tiles whose sizes are varied, whose widths are less than the width of the output image frame being generated, and whose heights are less than the height of the output image frame. A tile processor program executing on a processor in the camera determines configuration information for configuring each pipeline stage based on user input and camera usage. The configuration information is determined so that the pipeline outputs properly combine to form the output image frame. The sizes, shapes, locations and processing order of the tiles are determined such that a single tile of a particular size is in a desired location with respect to the overall image frame, thereby facilitating such functions as autofocus, autoexposure and face detection.

20 Claims, 16 Drawing Sheets

DIGITAL CAMERA EMPLOYING IMAGE PIPELINE WITH DYNAMIC TILE SIZING

DIGITAL CAMERA EMPLOYING IMAGE PIPELINE
WITH DYNAMIC TILE SIZING

5x5 BLOCK OF
PIXELS OF AN INPUT
IMAGE FRAME

8x8 BLOCK OF PIXELS
OF AN OUTPUT IMAGE
FRAME

ZOOM UP 1.5X EXAMPLE

RUNNING THE PIPELINE

FIRST PASS THROUGH PIPELINE

SECOND PASS THROUGH PIPELINE

ZOOM_IN = (3,3)
ZOOM_OUT = (5,5)
RATIO = (1.5, 1.5)
EDGE = TOP
PHASE = 0

INTO ZOOM 1.5X

OUT OF ZOOM

USM_IN = (5,5)
USM_OUT = (1,3)
EDGE = TOP

INTO UNSHARP MASK

OUT OF UNSHARP MASK

THIRD PASS THROUGH PIPELINE

ZOOM_IN = (4,3)
ZOOM_OUT = (5,5)
RATIO = (1.5, 1.5)
EDGE = RIGHT, TOP
PHASE = 1

1.5X

INTO ZOOM

OUT OF ZOOM

USM_IN = (5,5)
USM_OUT = (3,3)
EDGE = RIGHT, TOP

INTO UNSHARP MASK

OUT OF UNSHARP MASK

FOURTH PASS THROUGH PIPELINE

ZOOM_IN = (3,3)
ZOOM_OUT = (5,5)
RATIO = (1.5, 1.5)
EDGE = LEFT
PHASE = 0

1.5X

INTO ZOOM

OUT OF ZOOM

USM_IN = (5,5)
USM_OUT = (3,1)
EDGE = LEFT

INTO UNSHARP MASK

OUT OF UNSHARP MASK

FIFTH PASS THROUGH PIPELINE

INTER-STAGE TRANSFER

DETERMINING PIPELINE
CONFIGURATION VALUES

DETERMINING PIPELINE
CONFIGURATION VALUES

DYNAMIC TILE SIZING IN AN IMAGE PIPELINE

TECHNICAL FIELD

The present disclosure relates to imaging pipelines within digital cameras and to the control of imaging pipelines.

CROSS REFERENCE TO COMPACT DISC APPENDIX

The Compact Disc, which is a part of the present disclosure, includes a recordable Compact Disc (CD-R) containing information that is part of the disclosure of the present patent document. A portion of the disclosure of this patent document contains material that is subject to copyright protection. All the material on the Compact Disc is hereby expressly incorporated by reference into the present application. The copyright owner of that material has no objection to the facsimile reproduction by anyone of the patent document or the patent disclosure, as it appears in the Patent and Trademark Office patent files or records, but otherwise reserves all copyright rights.

BACKGROUND

FIG. 1 (Prior Art) is a simplified diagram that illustrates operation of one type of conventional digital camera. An image is captured by an image sensor 1, and the captured image data is digitized. The digitized image data is stored into a memory integrated circuit 2 as indicated by arrow 3. The image data is then to be image processed through what is sometimes called an "image pipeline". Various different types of processing are performed on the image data in the image pipeline. This processing may include, for example, Bayer-to-RGB conversion, white balancing, autoexposure, autofocus, color correction, gamma correction, unsharp masking, mirroring, resizing, and color space conversion. A stage of the pipeline performs one of these types of processes. Many of these processes operate on regions of pixels that span multiple rows of pixels. Consequently, multiple rows of pixels are read into the image processing integrated circuit 4 as indicated by arrow 5 so that a necessary region of pixels is in integrated circuit 4 for processing. A first type of processing is then performed by a first stage 6, and the result of the processing is stored in a buffer memory 7. Each such stage of integrated circuit 4 operates in a similar fashion. Between each pair of adjacent processing stages is a buffer memory for holding the data as it passes from one stage to the next through the pipeline.

Over time, the size of digital images captured on conventional consumer market digital cameras has increased from three, to four, to five, to six megapixels and more. Due to this increase in image capture size, the buffer memories within image processing integrated circuits have increased. There are many such buffer memories in an image processing integrated circuit that has many stages in its pipeline. The increase in the size of the buffer memories has an undesirable effect on the manufacturing cost and power consumption of the overall image processing integrated circuit. As the consumer digital camera market demands ever larger digital images, the costs of the image processing integrated circuit component of the digital camera will likely increase noticeably not due to the processing circuitry on the image processing integrated circuit, but rather just due to the buffer memory required between stages.

SUMMARY

An image pipeline within a digital camera performs image processing operations (for example, Bayer-to-RGB conversion, white balancing, autoexposure, autofocus, color correction, gamma correction, zooming, unsharp masking, mirroring, resizing, and color space conversion) on "tiles" whose widths are less than the width of the output image frame being generated and whose heights are less than the height of the output image frame. The size of the tiles being processed is varied from pass to pass through the pipeline. A novel tile processor program executing on a processor in the camera dynamically determines configuration information for configuring each stage of the pipeline during each pass through the pipeline based on user input, camera settings, and how the camera is being used. The configuration information is determined so that the outputs of the pipeline properly form the output image frame. The size of the tiles processed by the pipeline can be determined such that a single tile of a particular size will be in a desired location with respect to the overall image frame. Dynamic sizing and placement of this tile facilitates such functions as autofocus, autoexposure and face detection. The numbers of pixels passed from stage to stage during a pass through the pipeline typically changes from stage to stage depending on the requirements of the various stages.

Multiple tiles can be processed through the pipeline at the same time in a pipelining fashion so that a different tile is processed by each different stage in the pipeline, or alternatively one tile can be passed through all the stages of the pipeline by itself without other tiles being processed in the pipeline. Tiles do not need to be processed in a left to right, row by row order, through an image frame. In one embodiment, a tile located in a desired part (for example, a center part) of the image frame is processed first, where the tile is a tile that contains pixels needed for a function such as autofocus, autoexposure or face detection. By only reading in and processing tiles of limited width as compared to reading in and processing multiple lines of an input image frame, the amount of buffer memory necessary to realize the image pipeline is reduced.

Other embodiments and methods and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
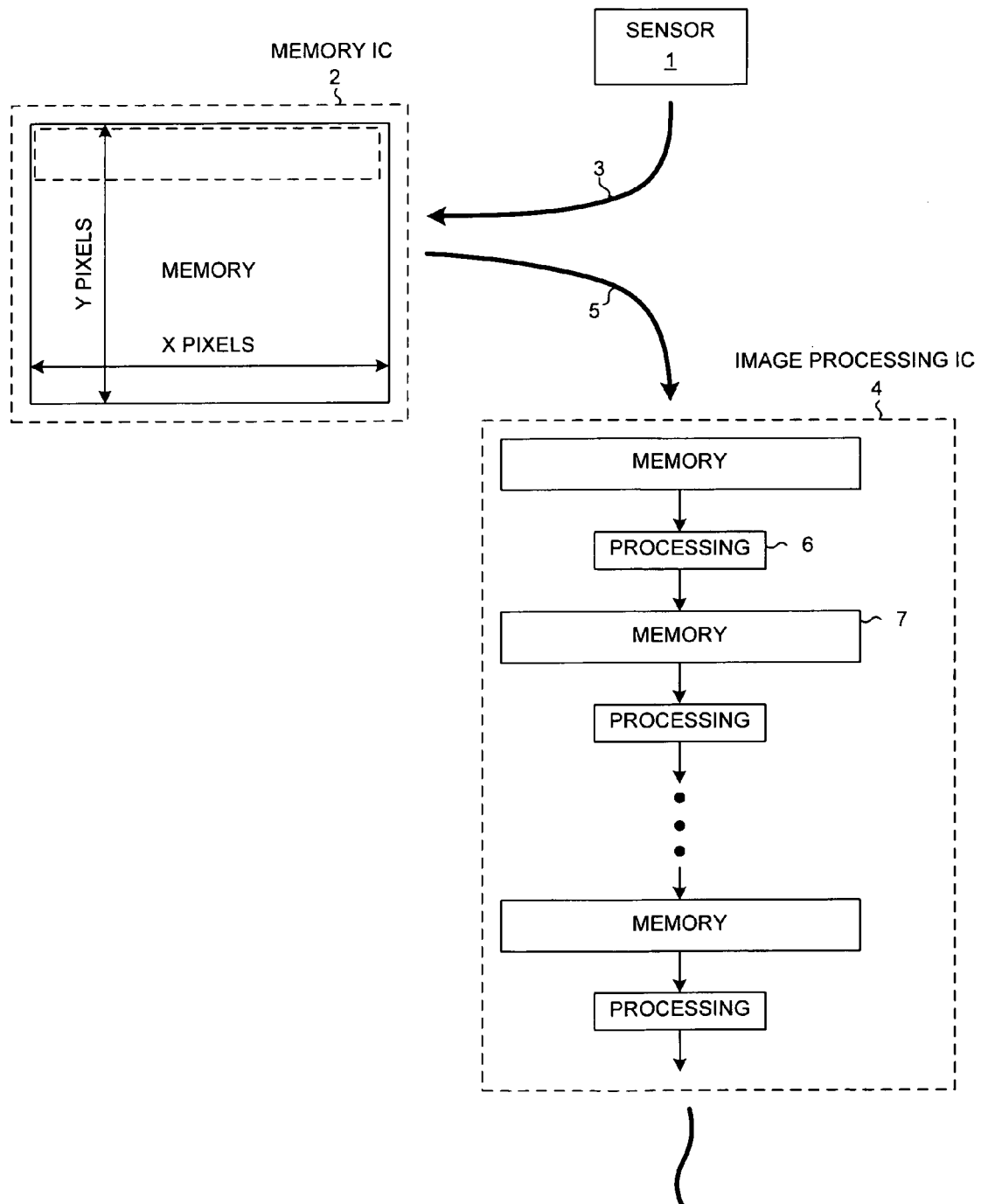
FIG. 1 (Prior Art) is a simplified diagram that illustrates operation of one type of conventional digital camera.
Figure 2:
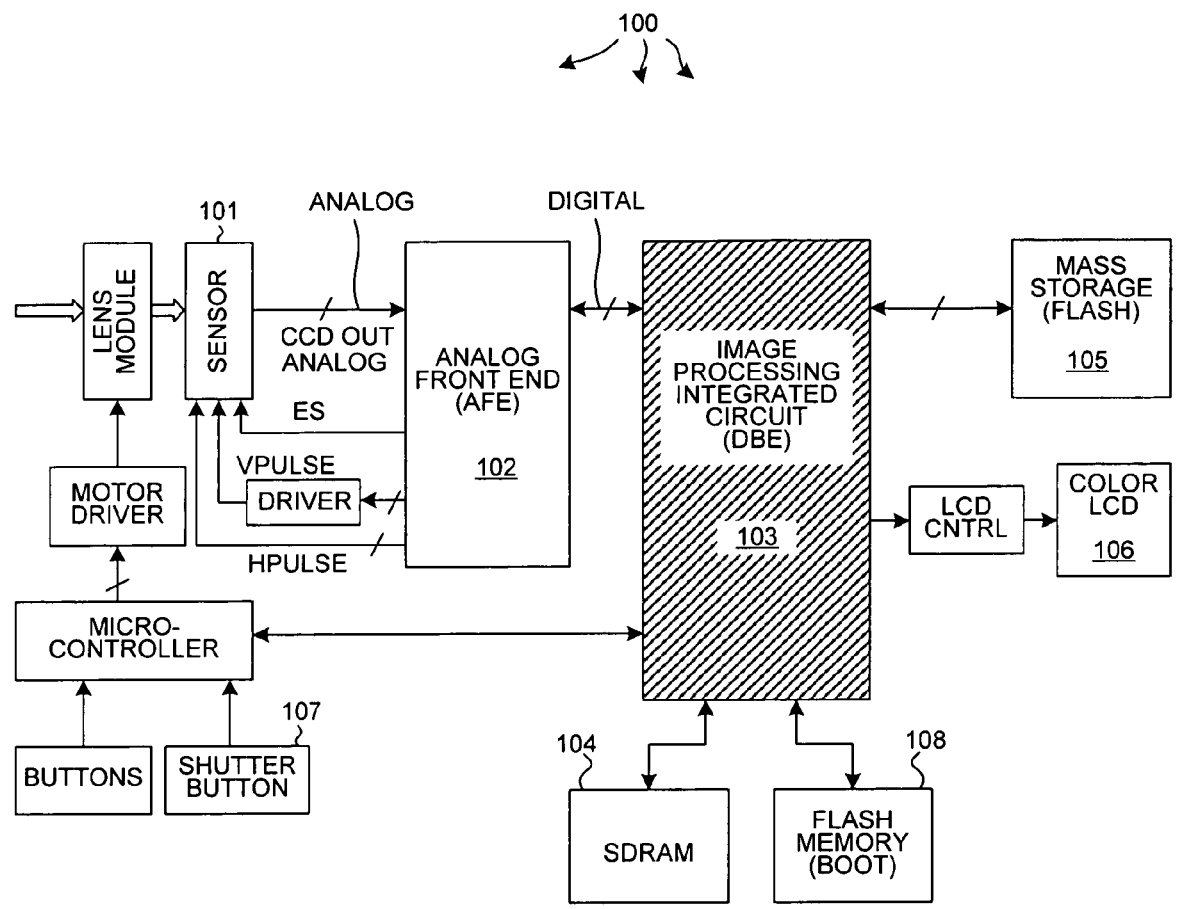
FIG. 2 is a diagram of a digital camera 100 in accordance with one novel aspect.

FIG. 2 is a simplified high level diagram of a digital still camera 100 in accordance with one novel aspect. An image is captured by an image sensor 101. Analog image data from image sensor 101 is digitized by analog-front end (AFE) integrated circuit 102. The resulting digital image data is passed to image processing integrated circuit 103 (also referred to as a "digital back end" or "DBE") and is stored in SDRAM 104. Image processing integrated circuit 103 then reads the image data back out of SDRAM 104 and performs many different types of image processing on the image data, and then compresses the resulting image data into a file, and stores the image data in the form of a compressed file into mass storage 105. Mass storage 105 may, for example, be an amount of removable non-volatile memory such as flash memory. As the user of the digital camera 100 is moving the camera around to compose a digital photograph to be captured, the digital camera operates in a preview mode and displays on LCD display 106 an image of what the digital photograph would look like were the shutter button 107 to be pressed and an actual high resolution digital image were to be captured. Image processing integrated circuit 103 includes a digital processor that executes programs of processor-executable instructions. These programs are initially stored in non-volatile boot memory 108. When the digital camera is turned on for use, one or more these programs that are to be executed are read out of boot memory 108 and are transferred to SDRAM 104. The processor then executes the programs out of SDRAM 104.

Figure 3:
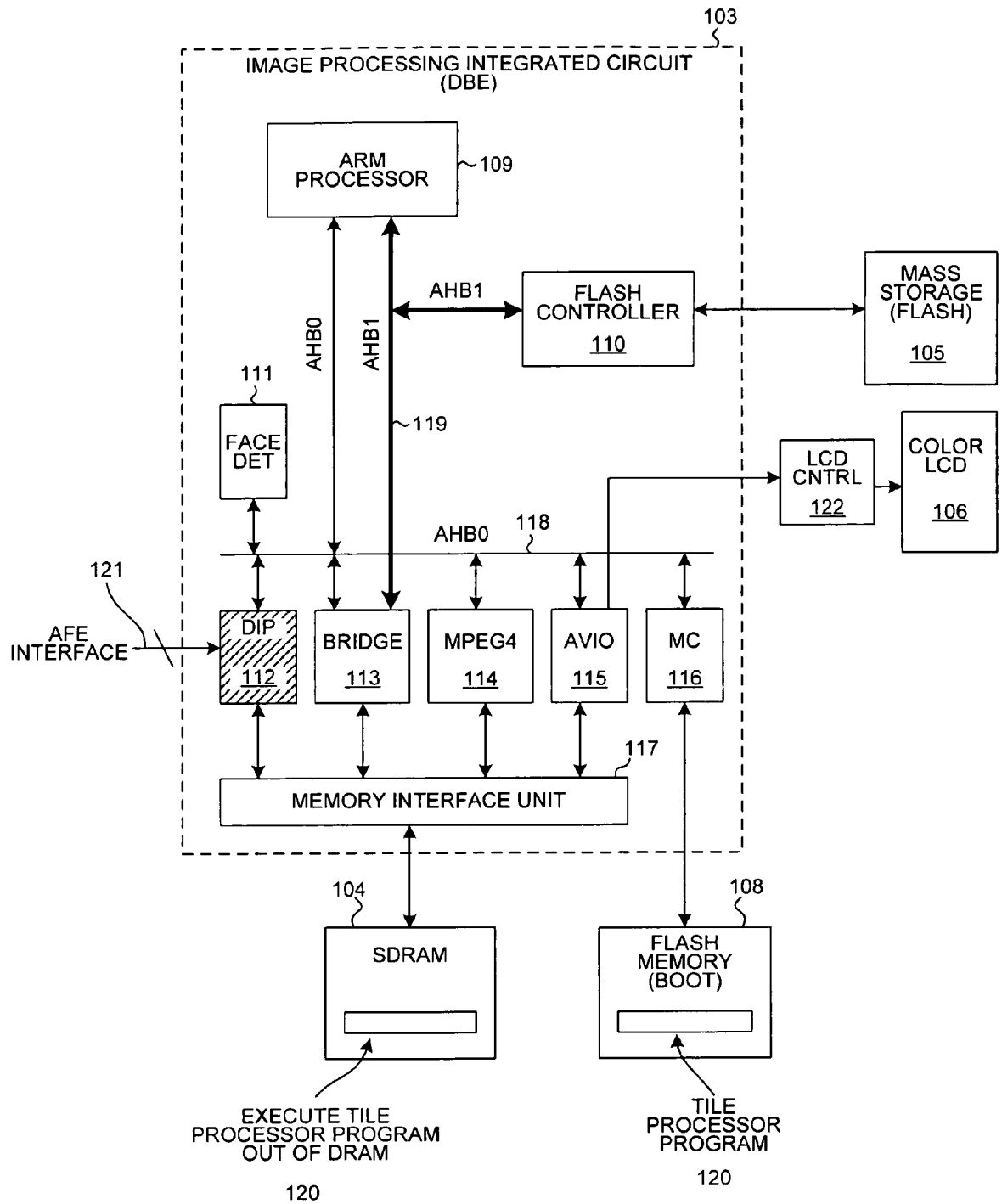
FIG. 3 is a diagram that illustrates the image processing integrated circuit (the Digital Back End or "DBE") 103 of the digital camera 100 of FIG. 2 in more detail.

FIG. 3 is a diagram that shows image processing integrated circuit 103 in more detail. Image processing integrated circuit 103 includes a processor 109, a flash memory controller 110, a face detection processing circuit 111, a digital imaging pipeline (DIP) circuit 112, a bridge 113, an MPEG4 compression/decompression circuit 114, an AVIO circuit 115, a second flash memory controller 116, and a memory interface unit (MIU) 117. Processor 109 is coupled to the various other circuits 111-116 (other than MIU 117) by parallel AHB0 and AHB1 busses 118 and 119 as illustrated. A program 120, called a "tile processor program", is initially stored in non-volatile memory 108. When the digital camera is turned on for use, tile processor program 120 is read out of boot memory 108 by memory controller 116 and is transferred across AHB0 bus 118 to bridge 113 and from bridge 113 through MIU 117 into SDRAM 104. Once this transfer has occurred during booting of the camera, processor 109 can then execute program 120 out of SDRAM 104. Image data from AFE 102 is received into the digital imaging pipeline (DIP) circuit 112 across a set of digital input leads 121 as illustrated. Information to be displayed on the LCD display 106 of the camera is output from IC 103 by AVIO circuit 115 to LCD controller 122, which in turn drives LCD display 106.

Figure 4:
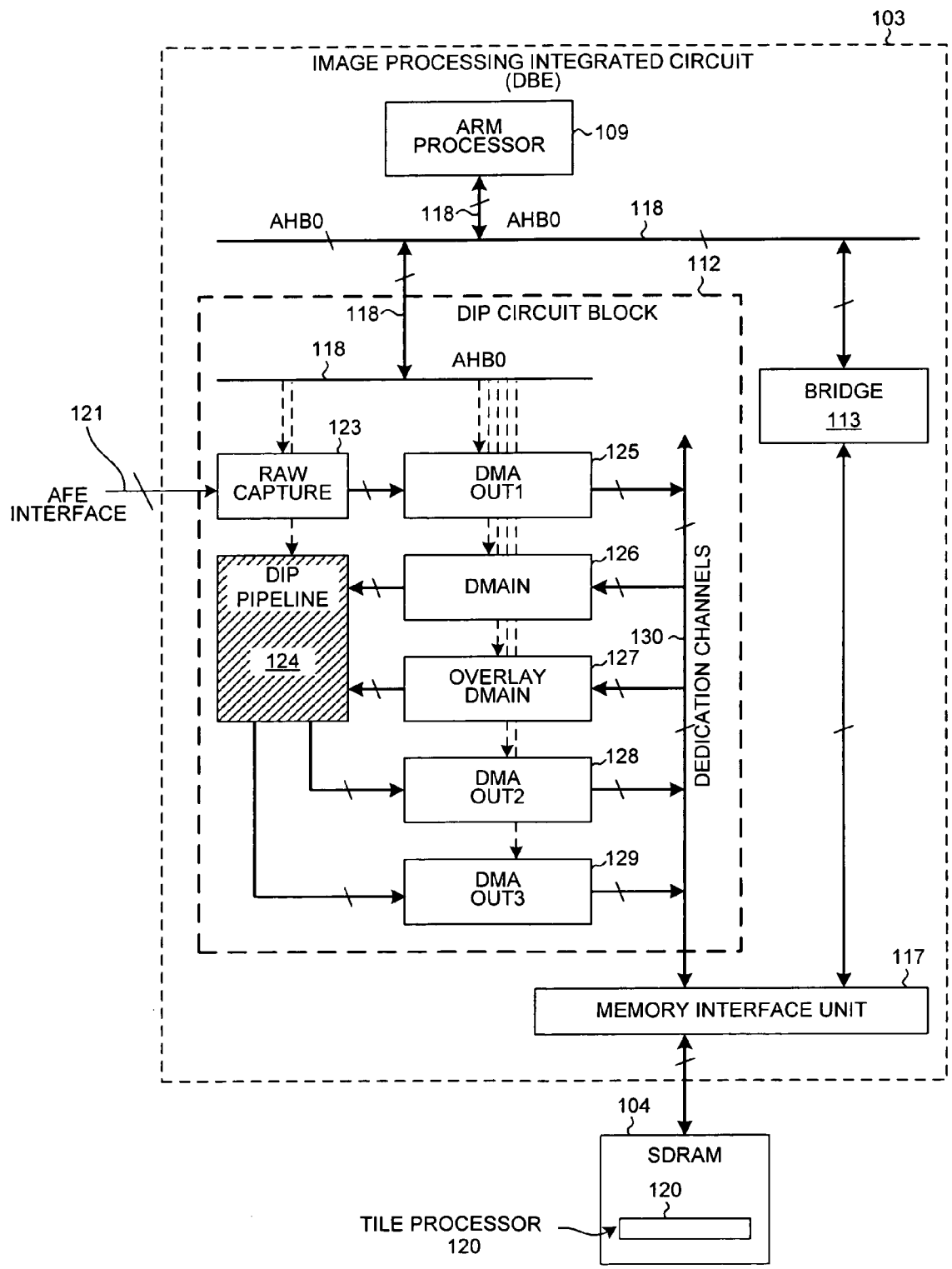
FIG. 4 is a diagram that illustrates the Digital Imaging Pipeline (DIP) circuit block 112 of the DBE integrated circuit 103 of FIG. 3 in more detail.

FIG. 4 is a diagram that shows digital imaging pipeline (DIP) circuit block 112 in more detail. DIP circuit block 112 includes a raw capture block 123, the actual digital imaging pipeline (DIP pipeline) 124, a first direct memory access output block (DMA OUT1) 125, a direct memory access input block (DMAIN) 126, an overlay direct memory access input block (OVERLAY DMAIN) 127, a second direct memory access output block (DMA OUT2) 128, and a third direct memory access output block (DMA OUT3) 129. Processor 109 can write and read information, including control information, into and out of control registers in each of the blocks 123-129 across AHB0 bus 118. The dashed vertically extending lines in FIG. 4 illustrate the writing of control information into blocks 123-129 by processor 109 via AHB0 bus 118. The DMA blocks 125-129 can transfer image data to and from memory 104 via parallel bus 130 and MIU 117. Image data coming in from AFE 102 flows into image processing integrated circuit 103 via AFE interface leads 121 and to raw capture block 123. DMA OUT1 block 125 and MIU 117 function together to transfer the image data from raw capture block 123, through DMA OUT1 block 125, across bus 130 of dedicated channels, and through MIU 117 to memory 104. Image data to be processed is then transferred by MIU 117 and DMAIN block 126 back out of memory 104, through MIU 117, across bus 130, through DMAIN block 126 and to DIP pipeline 124. Information to be overlayed, if there is any, is transferred by MIU 117 and OVERLAY DMAIN 127 from memory 104, through MIU 117, across bus 130, through OVERLAY DMAIN block 127, and into DIP pipeline 124. Once the image data has been processed by DIP pipeline 124, it is transferred back to memory 104 by one or both of two paths. Either the processed image data passes through DMA OUT2 block 128, across bus 130, and through MIU 117, and into memory 104, and/or the processed image data passes through DMA OUT3 block 129, across bus 130, and through MIU 117, and into memory 104. Processor 109 fetches instructions of program 120 and accesses data from memory 104 via AHB0 bus 118, bridge 113, and MIU 117.

Figure 5:
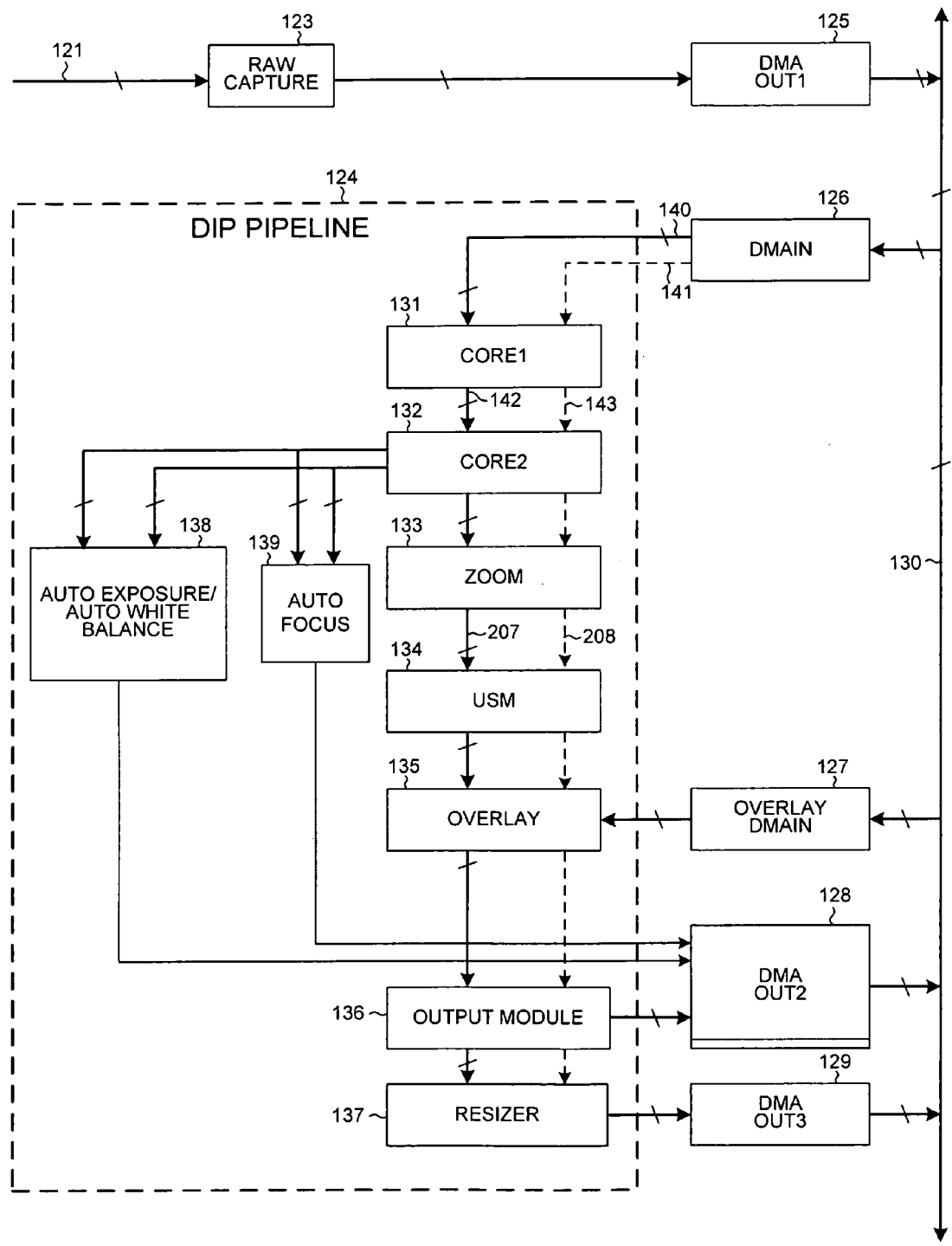
FIG. 5 is a diagram that illustrates the DIP pipeline 124 within the DIP circuit block 112 of FIG. 4 in more detail.

FIG. 5 illustrates DIP pipeline 124 of FIG. 4 in more detail. DIP pipeline 124 is an image pipeline that includes a number of stages 131-139. Stage 131 is a stage called "CORE1". Stage 132 is a stage called "CORE2". Stage 133 is a stage that performs a zoom function. Stage 134 is a stage that performs an unsharp mask function. Stage 135 is a stage that performs an overlay function. Stage 136 is an output module stage. Stage 137 is a stage that performs resizing. Pipeline 124 also includes a stage 138 that performs an autoexposure/autowhite balance function, and a stage 139 that performs an autofocus function. Pixels of image data are transferred from DMAIN block 126 to stage 131 using parallel data lines 140 and control lines 141. Control lines 141, in this example, include a clock signal (CLK), a start of tile signal (SOT), an end of line signal (EOL), an end of tile signal (EOT), and a data enable or data valid signal (DATA_EN). Each successive one of stages 131-136 has its own similar set of parallel data lines and associated control lines for communicating pixels of image data to the next stage in the pipeline. For example, parallel data lines 142 and control lines 143 are used to communicate pixels of image data from stage 131 to stage 132.

Operation of the image pipeline 124 is explained in connection with an example as set forth in FIGS. 6-12. In the example, each of stages 131, 132, 135 and 137 is configured by processor 109 via AHB0 bus 118 to perform no operations, but rather just to pass the pixels of image data received through to the next stage in the pipeline. Stage 133 is, however, configured to perform a 1.5 zoom up (1.5×) operation, and stage 134 is configured to perform an unsharp mask operation.

Figure 6:
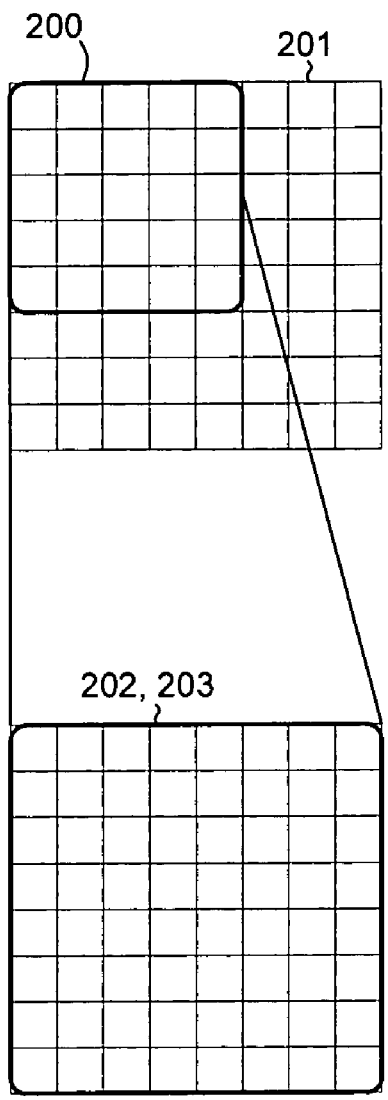
FIG. 6 illustrates a five-by-five block of pixels of an input image frame that is processed to generate an eight-by-eight block of pixels of an output image frame in an operational example of pipeline 124.

FIG. 6 illustrates the zoom up operation to be performed. A selected five-by-five block of pixels 200 of an input image frame 201 is to be zoomed up to create an eight-by-eight block 202 of an output image frame 203.

Figure 7:
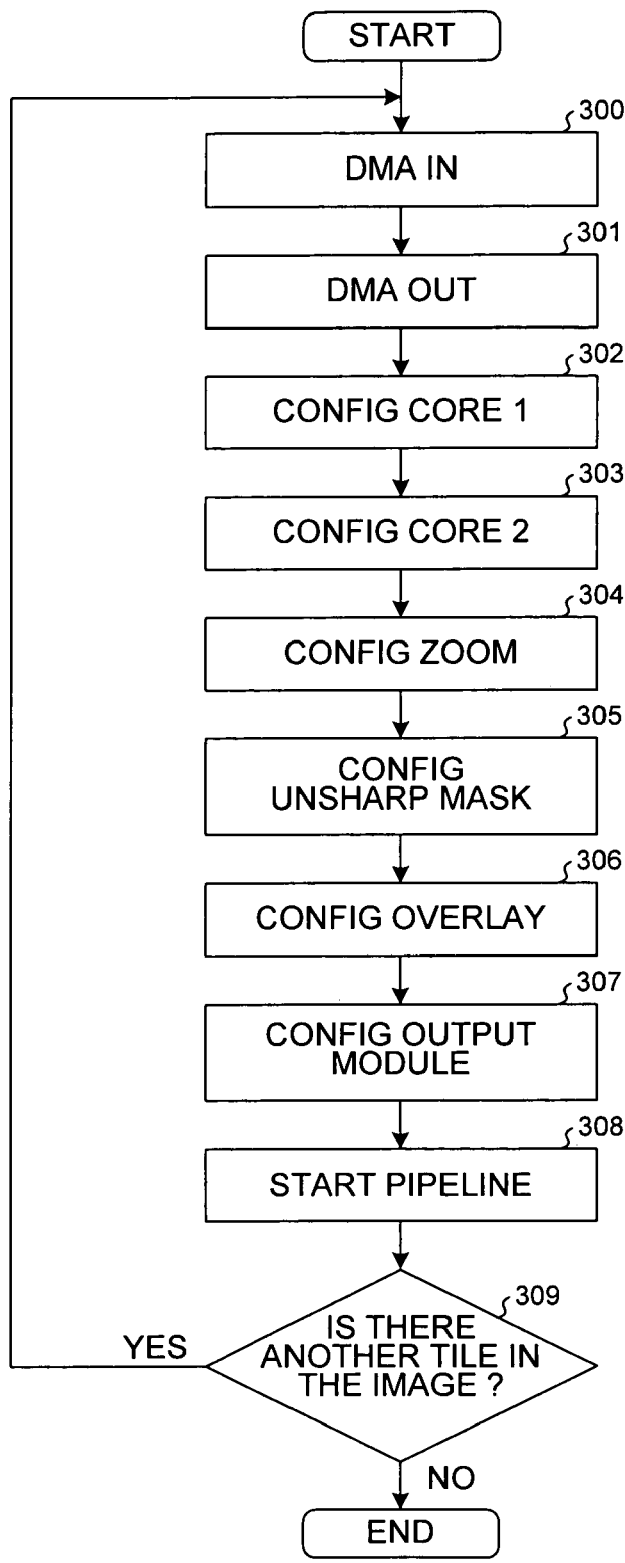
FIG. 7 is a flowchart that illustrates the running of the pipeline 124.

FIG. 7 illustrates the operation of "tile processor" program 120. First (step 300), processor 109 configures DMA IN block 126 to transfer a set of pixels from the input image frame 201 in memory 104 to CORE1 stage 131. Next (step 301), processor 109 configures DMA OUT2 block 128 to transfer processed pixels from OUTPUT MODULE stage 136 to an appropriate place in output image frame 203 in memory 104. Processor 109 then (steps 302-307) configures each of the stages 131-136 for one pass through the pipeline. Processor 109 then (step 308) issues an instruction for all the stages to perform their respective operations. The process of steps 300-308 is repeated, such that each tile is supplied into the first stage of the pipeline and is processed through each stage of the pipeline, until it emerges from the bottom of the pipeline as an output from stage 136 and is transferred to memory 104. When all the tiles of the incoming block 200 (see FIG. 6) have been processed through the pipeline (as determined in step 308), then the process stops. The processed tiles, which are now in memory 104, together form block 202 of the output image frame 203.

Figure 8:
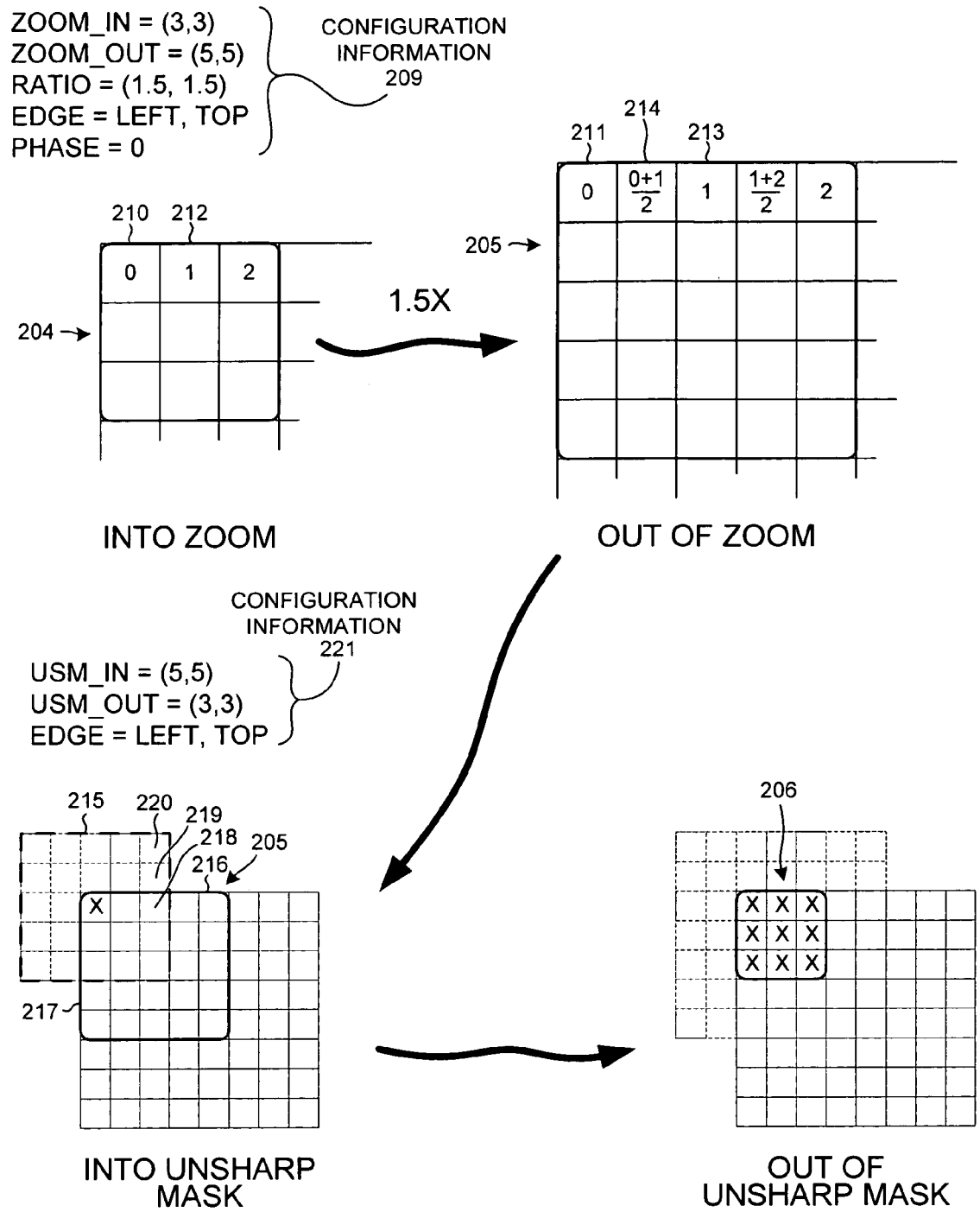
FIGS. 8-12 illustrate how tiles of pixels are processed through pipeline 124 in one operational example.

FIG. 8 illustrates a first pass through pipeline 124. Processor 109 configures DMAIN block 126 to transfer the three-by-three block of pixels 204 (in the upper left corner of the five-by-five block of pixels 200 of FIG. 6) to stage 133 through stages 131 and 132. Stages 131 and 132 perform no operations (NO OPS) in this example as described above but rather just pass the pixels through to stage 133. Stage 133 performs a zoom up by 1.5× and therefore converts three-by-three block 204 of pixels into a five-by-five block 205 of pixels. The five-by-five block 205 of pixels is passed to the unsharp mask stage 134 of the pipeline via parallel data lines 207 and associated control lines 208. The unsharp mask operation is then performed on the five-by-five block 205. The result is a three-by-three block 206 of pixels as output from unsharp mask stage 134. This three-by-three block 206 is passed through stages 135 and 136. DMA OUT2 block 128 transfers block 206 to memory 104.

The operations of FIG. 8 are now described in further detail. Reference numeral 209 identifies configuration information that execution of tile processor program 120 causes to be supplied to stage 133 in step 304 of FIG. 7. Configuration information 209 tells zoom stage 133 the size of input block it is to receive (a three-by-three block) and the size of output block it is to produce (a five-by-five block). Configuration information 209 identifies the zoom up ratio is 1.5×. The values "0", "1" and "2" in the upper left diagram of FIG. 8 do not indicate values of pixels, but rather are numbers that identify the pixels. The value of pixel "0" in the upper left pixel position 210 of the upper left diagram of FIG. 8 is the value in the upper left pixel position 211 of the upper right diagram of FIG. 8. Similarly, the value of pixel "1" in pixel position 212 of the upper left diagram of FIG. 8 is the value in pixel position 213 in the upper right diagram of FIG. 8. A pixel value is created for intervening pixel position 214 in the upper right diagram of FIG. 8. The "(0+1)/2" notation means that the new pixel value is the average of the values of pixel "0" and pixel "1". Note that two pixels (pixel "0" and pixel "1") are received and three pixels (in pixel positions 211, 214 and 213) are created. This process of creating pixels occurs in both the X and Y dimensions.

Note that there are multiple ways that five-by-five block of pixels can be created from a three-by-three block of pixels. One way is as illustrated in FIG. 8. The second involves the same resulting pixel values, but the pixel values are shifted in pixel location. The upper row of pixels in the upper right diagram of FIG. 8 may, for example, be of values "(0+1)/2", "1", "(1+2)/2", "2", and "(2+3)/2". The first way as illustrated in FIG. 8 is denoted "phase 0", whereas the second way is denoted "phase 1". Configuration information 209 includes configuration information that instructs stage 133 to use the "phase 0" way of producing output pixels.

The pixel values of the five-by-five block 205 of the upper right diagram of FIG. 8 are transferred to the unsharp mask stage 134 via parallel data lines 207 and control lines 208.

Figure 13:
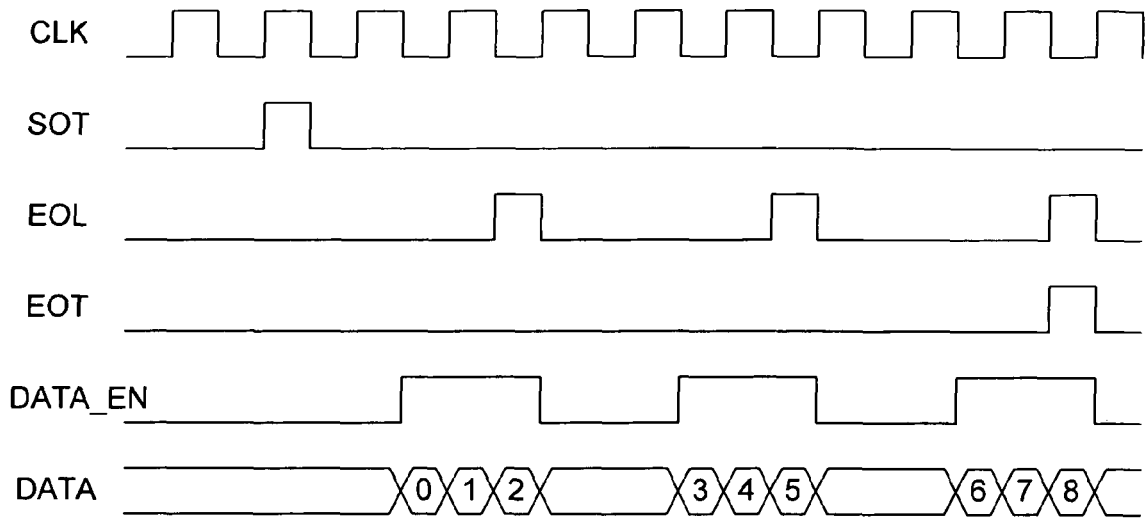
FIG. 13 is a waveform diagram that illustrates how pixel values are transferred from stage to stage within pipeline 124.

FIG. 13 illustrates how a three-by-three block of pixel values would be transferred between stages. The transmitting stage informs the receiving stage of a start of frame condition. The DATA_EN is then asserted and pixel values are supplied over the parallel data lines. The CLK signal is used by the receiving stage to clock in each pixel value until an end of line condition is detected by the EOL signal being asserted. The receiving stage knows due to the assertion of EOL that the next pixel value is to be on a next row with respect to pixel values already received. The DATA_EN is asserted again and pixel data values are driven out of the transmitting stage and are clocked into the receiving stage synchronously using the signal CLK. This process occurs row-of-pixel-values-by-row-of-pixel-values until the end of tile condition occurs as indicated by assertion of the EOT signal.

Returning to FIG. 8, stage 134 then performs the unsharp mask operation on the pixel values received from stage 133. To generate a single pixel value, the unsharp mask operation requires a five-by-five block of pixel values as inputs. Such a five-by-five block 215 of pixels that is necessary to generate a single pixel value (designated by the "X") is illustrated in the diagram at the lower left of FIG. 8. Note that pixel values outside the edges of input image frame 201 are required to calculate pixel value "X". These pixel values are generated by stage 134 in accordance with particular rules based on the pixel values within the image frame adjacent to the relevant edge (either top edge 216 or left edge 217). In this example, the value of the pixel closest to the edge is simply copied out over the edge to be the values of the pixels that extend outward away from the edge. For example, value of pixel 218 is copied and becomes the value of pixel 219 and the value of pixel 220 extending upward from top edge 216. This same process is applied by stage 134 in the horizontal dimension and vertical dimension to obtain pixel values as necessary outside the edges of input image frame 201. Due to the number of pixels required to calculate a single output of the unsharp mask operation, only nine pixel values can be calculated. Because the unsharp mask operation requires information about whether pixel values must be generated outside the edges of the input image frame, configuration information 221 for stage 134 includes "EDGE" configuration information indicating to stage 134 that the incoming pixel values are at a top edge and a left edge of the input image frame. Configuration information 221 also indicates that the size of the incoming block of pixel values is five-by-five, and that the size of the block of pixel values to be generated is three-by-three.

Figure 9:
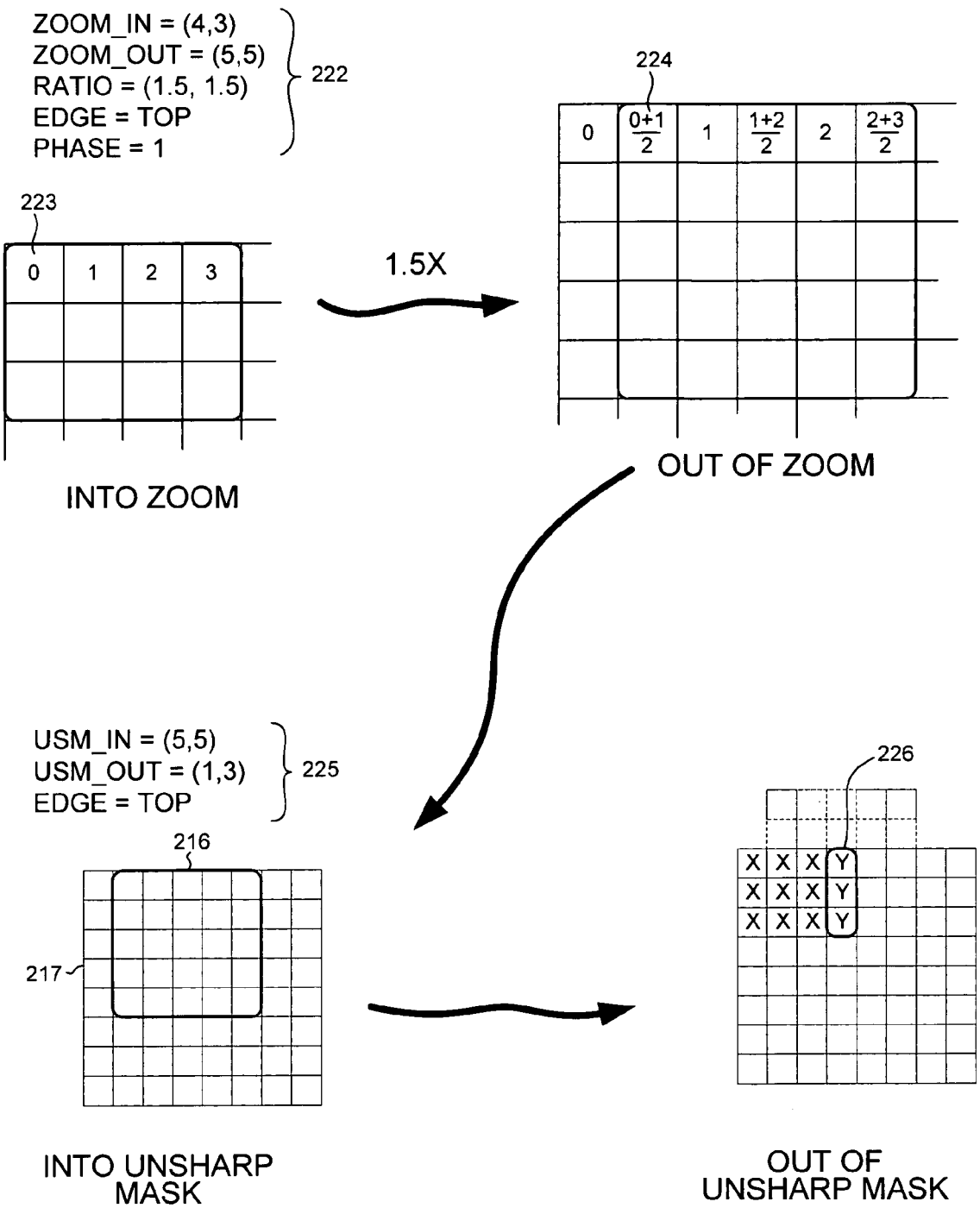

FIG. 9 illustrates the processing of stages 133 and 134 in a second pass through the pipeline. Note that the configuration information 222 supplied to stage 133 indicates that the output pixels are to be generated using the "phase 1" algorithm. The value of the leftmost pixel value 223 is not placed into pixel value position 224, but rather the value "(0+1)/2" is placed into pixel value position 223. The unsharp mask operation does not require pixel values to the left of the left edge 217. Configuration information 225 supplied to stage 134 therefore does not indicate a bordering left edge. Pixel values above top edge 216 are, however, still required. The edge information in configuration information 225 therefore indicates "EDGE=TOP". The diagram to the lower right of FIG. 9 indicates that only a region 226 of three pixel values is generated. Configuration information 225 therefore indicates "USM_OUT=(1,3)" which designates the output block is one pixel value wide in the horizontal dimension and three pixel values tall in the vertical dimension.

Figure 10:
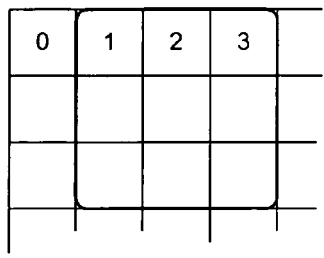
Figure 10:
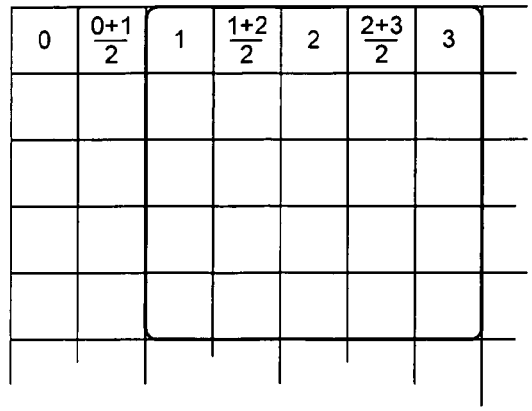
Figure 10:
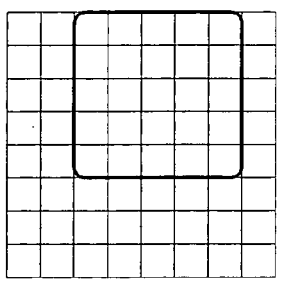

FIG. 10 illustrates the processing of stages 133 and 134 in a third pass through the pipeline. The output of unsharp mask stage 134 is the region of "Z" pixels. The configuration information supplied to stage 134 therefore indicates that the output of stage 134 is to be one pixel value wide and three pixel values tall.

Figure 11:
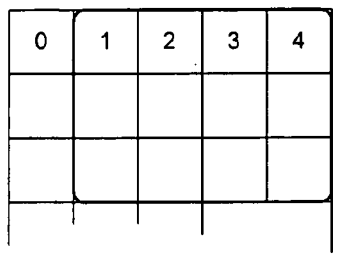
Figure 11:
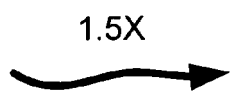
Figure 11:
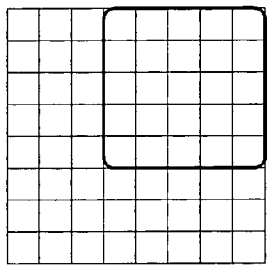
Figure 11:
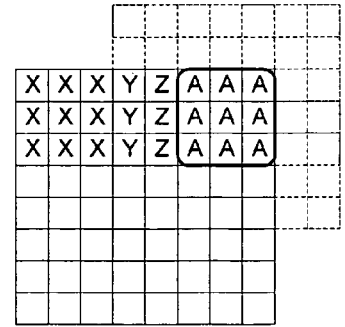
Figure 12:
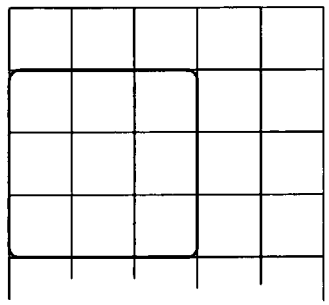
Figure 12:
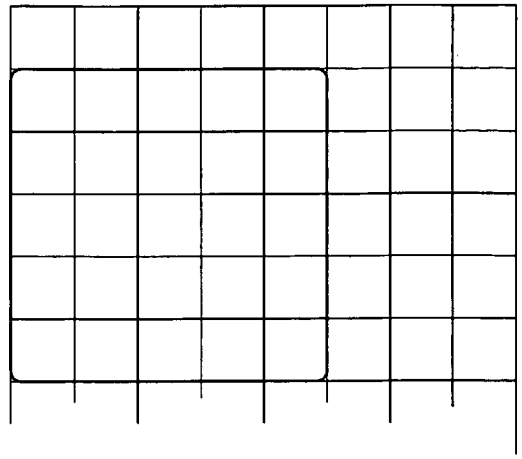
Figure 12:
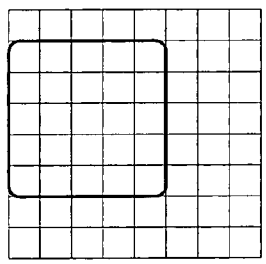
Figure 12:
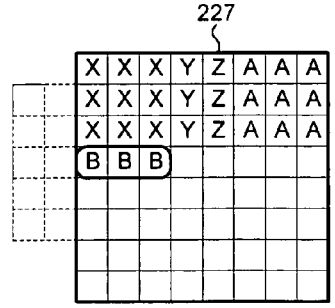

FIG. 11 illustrates the processing of stages 133 and 134 in a fourth pass through the pipeline. FIG. 12 illustrates the processing of stages 133 and 134 in a fifth pass through the pipeline. The resulting pixel values (designated "X", "Y", "Z", "A" and "B") are placed into memory 104 by DMA OUT2 block 128 so that they have the spatial relationship illustrated in FIG. 12. This process of running pipeline 124 is continued until a complete processed eight-by-eight block 227 is present in memory 104.

In operation, tile processor program 120 determines the configuration information for each stage of pipeline 124 for each one of a sequence of "start pipeline" instructions. A source code implementation of tile processor program 120 includes about sixty thousand lines of C++ code. A copy of the source code is included on the Compact Disc Appendix to this patent document. The C++ source code was compiled for execution on processor 109, which is an ARM processor, into approximately 145 k bytes of object code. "TileProcessor.h" is a header file for "TilePRocessor.cpp". "TileProcessor.cpp" is the high level program of tile processor program 120. The directory titled "Banding" contains subroutines that simulate the operations of the stages of the pipeline. These subroutines are called by the TileProcessor high level program. For example, the file "ZoomModule.h" is a header file for the "ZoomModule.cpp". The file "ZoomModule.cpp" is the subroutines that simulate operation of the zoom stage. "AeAwbModule.cpp" is the autoexpose and autowhite balance subroutines. "AfModule.cpp" is the autofocus subroutines. "BaseModule.cpp" and "GenericModule.cpp" include common subroutines the simulate operations of all the stages.

Figure 14A:
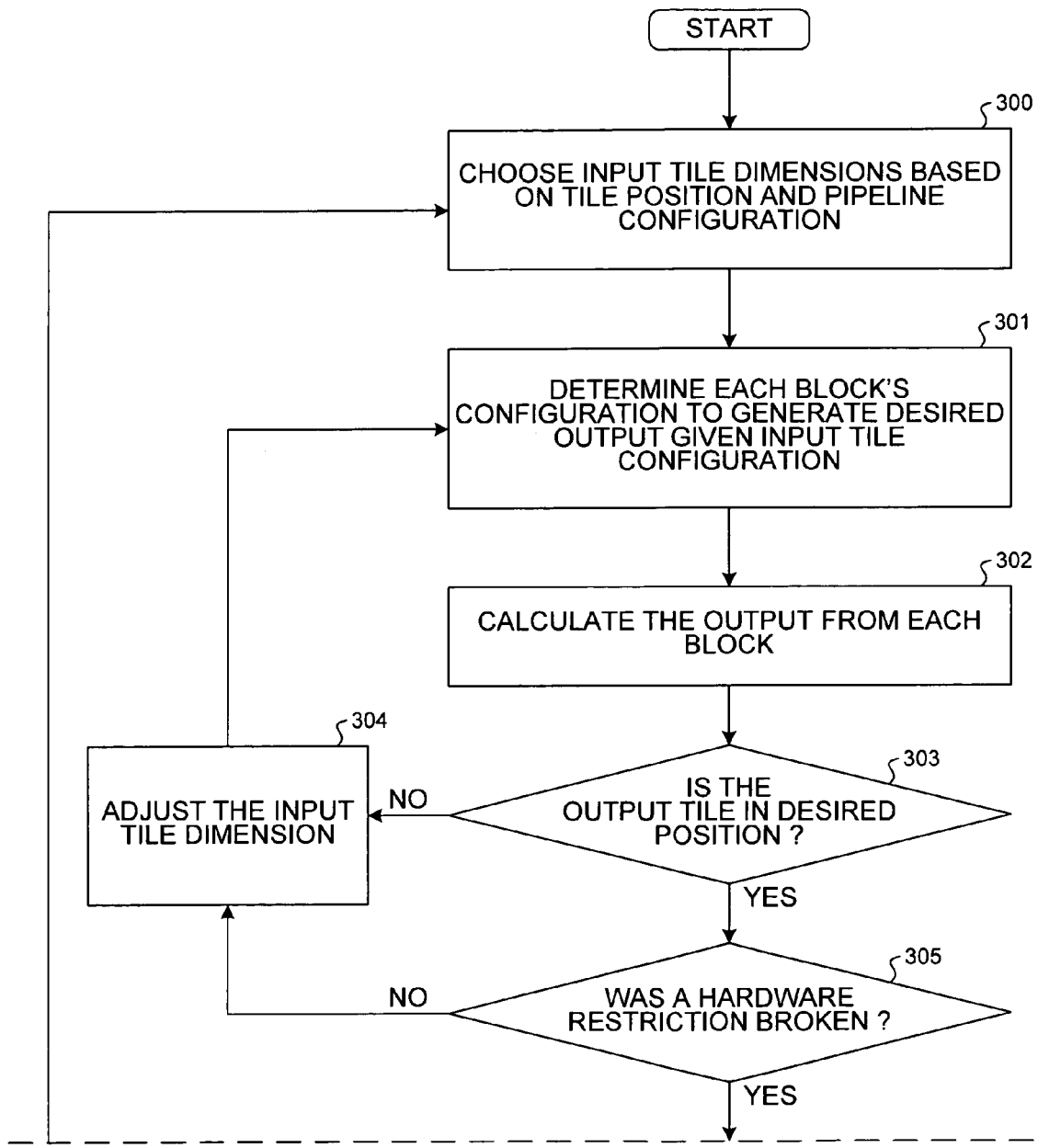
FIG. 14 is a flowchart that illustrates how tile processor program 120 operates to determine configuration information for each stage of pipeline 124.
Figure 14B:
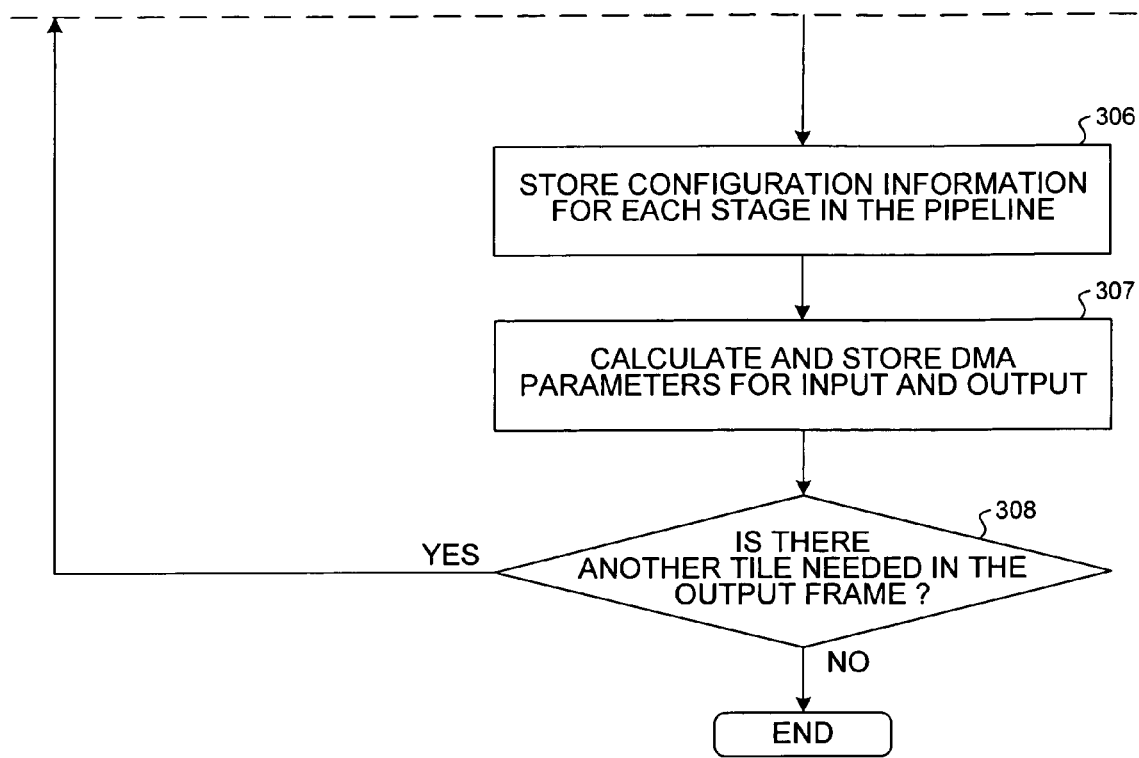
Figure 14B:
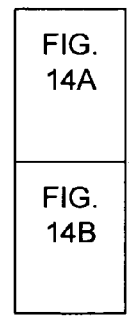

FIG. 14 is a simplified flowchart that illustrates operation of an example of tile processor program 120. Camera configuration and user inputs are received and used to determine which operations are to be performed on a captured input image frame. The possible operations that can be performed by the various stages of pipeline 124 are determined based on this configuration and input information. Tile processor program 120 uses an intelligent guessing scheme based on empirical data to choose an input tile of a chosen size (step 300). Program 120 then determines each stage's configuration information to generate a desired output tile (step 301). Program 120 then simulates how the chosen input tile would be processed through the various stages of pipeline 124 (step 302) to determine the size and location of the resulting output tile. If the resulting output tile is not in the correct position (step 303), then the pixels in the input tile are adjusted (304) and the processes of steps 301-303 is repeated. If the output tile that would be generated is in the desired position with respect to other output pixels already determined, then a determination is made (step 305) as to whether a hardware restriction of a stage in pipeline 124 would have to have been broken in order to generate the output tile. An example of a hardware restriction is the maximum horizontal dimension of the output tile generated by the stage. Another example of a hardware restriction is the maximum vertical dimension of the output tile generated by the stage. In the example of FIGS. 8-12, the maximum horizontal and vertical dimensions of the output of each of stages 133 and 134 is five-by-five pixels. If (step 305) no hardware restriction would have to be broken to generate the output tile, then program 120 stores the configuration information for each stage (step 306). Program 120 calculates (step 307) the addresses in memory 104 from which to DMA in the determined input tile into the first stage of the pipeline and stores an appropriate DMA command for later use by DMAIN block 126. Program 120 similarly calculates (step 307) the addresses in memory 104 into which the output tile is to be DMA-transferred so that it has a proper relationship to previously generated output tiles. One set of configuration information and associated DMA input and output commands is then determined. If there is another output tile to be generated (step 308), then processing returns to step 300. If configuration information for generation of all output tiles of the desired output image frame has been determined and stored, then the process is complete.

In one embodiment, the resulting sequence of sets of configuration information and associated DMA input and output commands are stored in boot memory 108. This sequence is for a common configuration of digital camera 100. When the user turns on the camera and if the camera is in the common configuration, then the previously stored sequence is retrieved and is used to run pipeline 124. There is no delay associated with having to execute program 120 to determine the sequence before the pipeline 124 can be run. Also, as digital camera 100 is used, processor 109 may be occupied performing tasks other than pipeline management and may not have adequate processing power bandwidth available to execute program 120. In such a situation, program 120 is executed when processing power bandwidth is available, and the resulting sequence of configuration information and DMA commands is stored for later use.

Figure 15:
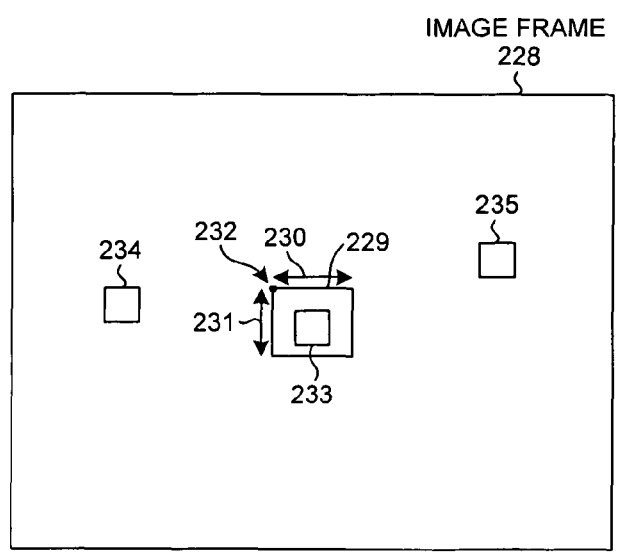
FIG. 15 illustrates how tile processor program 120 allows a tile to have any placement within a center portion of an image frame, so that an X-Y staring location of the tile is on any desired horizontal row of pixels in the center of the image frame, and so that the X-Y starting location is in any vertical column of pixels in the center of the image frame.

FIG. 15 illustrates an image frame 228. Due to the location of a human face as detected by face detection circuit block 111, a block of pixels that is to pass through pipeline 124 (a tile) is to include a region 229 of pixels. This region 229 has a horizontal dimension 230 and a vertical dimension 231 that can vary depending on how the camera is configured and depending on the subject of the image. Region 229 also has an X-Y starting location 232 that can be located on any horizontal row of pixels within the center portion of image frame 228. X-Y starting location 232 can also be located in any vertical column of pixels within the center portion of image frame 228. Once a human face is detected, a portion 233 of the pixels in this region 229 may be identified for use in performing an autofocus function. Other regions 234 and 235 of pixels can also be used in performing the autofocus function. These regions 233-235 may be referred to as "autofocus windows". The X-Y starting locations of these autofocus windows can also be on any horizontal row of pixels in the center part of image frame 228 and can be in any vertical column of pixels in the center part of image frame 228 (a row/column location of corner location 232 of the tile can be specified by the processor with a "granularity" of one row of pixels and one column of pixels).

In one novel aspect, the desired position of a tile of adequate size is defined for step 303 of the method of FIG. 14 such that all the necessary pixels of region 229 will be in the same tile at the appropriate stage in pipeline 124. Tiles surrounding this tile are then made to be of the appropriate sizes and shapes so that region 229 will be contained in a single tile. This facilitates the pipeline processing of pipeline 124. Autofocus block 139 of FIG. 5 receives all the pixels it needs to perform its autofocus function as a single output block of pixels from CORE2 stage 132. Autofocus block 139 then performs its function in parallel with the operations of one or more of stages 133-135. Information that is output from autofocus block 139 is merged with its corresponding block of pixels (i.e., tile of pixels) as the block of pixels passes out from output module stage 136 and into DMA OUT2 block 128. Tile processor program 120 dynamically calculates configuration information for pipeline 124 as the camera is being used such that regions 234, 229, and 235 can be placed anywhere in the center portion of image frame 228, starting on any row of pixels and starting on any column of pixels, depending on dynamically changing parameters including the subject of the image.

In camera 100, multiple tiles can be processed through the pipeline at the same time in a pipelining fashion so that a different tile is processed by each different stage in the pipeline (after each "start pipeline" instruction), or alternatively one tile can be passed through all the stages of the pipeline by itself (using multiple "start pipeline" instructions) without other tiles being processed in the pipeline. Tiles do not need to be processed in a left to right, row by row order, through an image frame. In one embodiment, a tile located in a desired part (for example, a center part) of the image frame is processed first, where the tile is a tile that contains all the pixels needed for a function such as autofocus, autoexposure or face detection. The sizes of tiles, shapes of tiles, location of tiles, and order of tile processing are determined dynamically by tile processor program 120.

Figure 16:
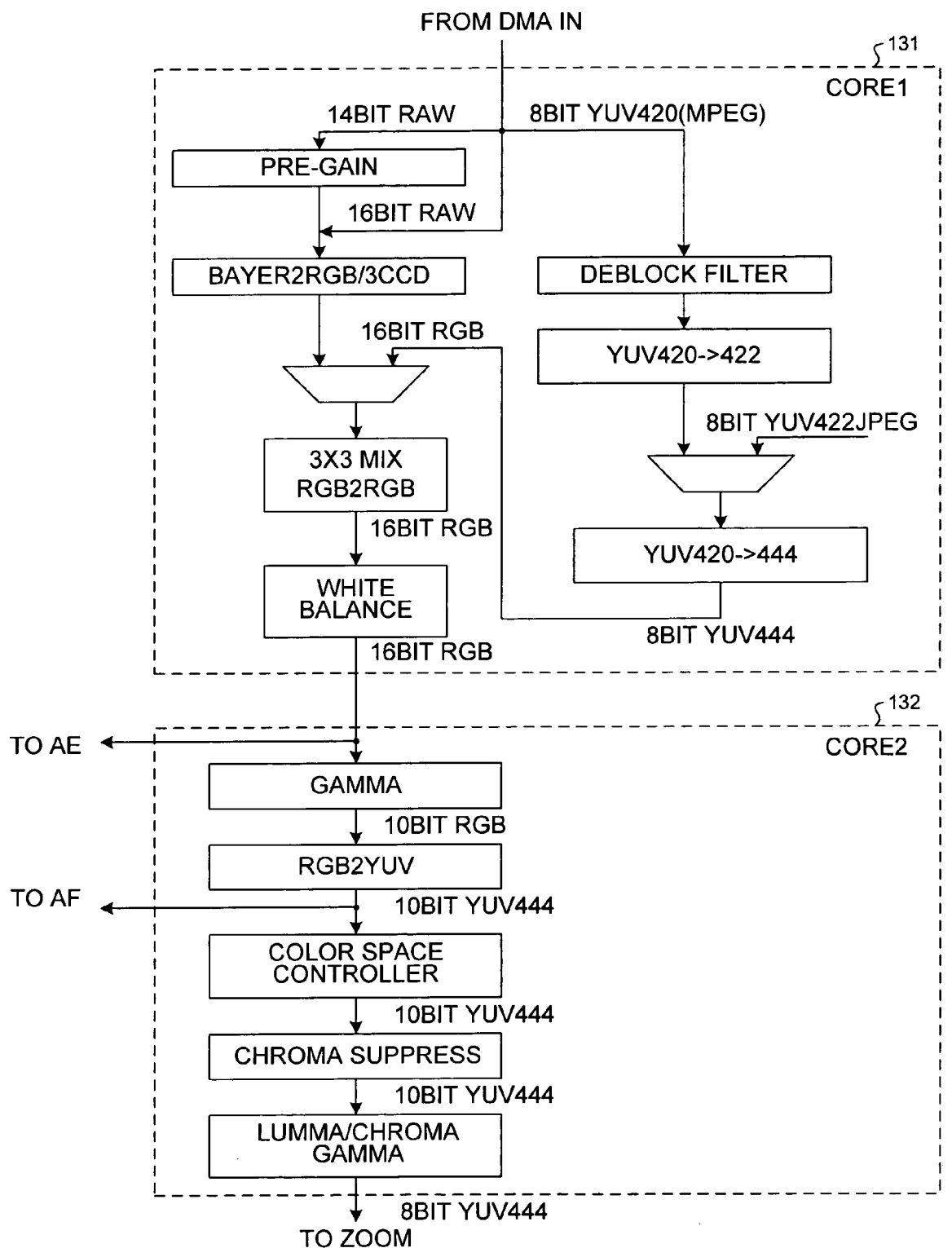
FIG. 16 is a block diagram that illustrates an example of the contents of the CORE1 stage 131 and the CORE2 stage 132 of FIG. 5.

FIG. 16 is a diagram that illustrates an example of the contents of the CORE1 stage 131 and the CORE2 stage 132 of FIG. 5.

Although the present invention has been described in connection with certain specific embodiments for instructional purposes, the present invention is not limited thereto. The phrase "pass through the pipeline" refers the either the passing of a tile of pixels through all the various stages of the pipeline over the course of multiple pipeline start instructions, or the combined operations performed by all the stages of the pipeline following one start instruction, or both, depending on the context in which the phrase is found. The image pipeline need not be part of an image capture device, but rather may be part of a play-back device that does not capture digital images, but rather is primarily used for rendering digital content in a separate display device. In one example, the play-back device employs the same DBE integrated circuit as in a digital camera (to take advantage of low per-part cost due to mass production of the DBE for the camera market), but in the play-back device the DBE integrated is only used for its play-back functionality. The play-back device is coupled to a television or other display devices such that the play-back device retrieves digital images and video and audio stored on the play-back device and then drives the display device so as to render a rich and interesting slide show. Accordingly, various modifications, adaptations, and combinations of various features of the described embodiments can be practiced without departing from the scope of the invention as set forth in the claims.

What is claimed is:

1. A method comprising:
   (a) configuring a plurality of stages of an image pipeline based on configuration information determined for each of the stages, wherein the stages include a first stage, a second stage and a last stage;
   (b) reading an input tile of pixels from a memory and supplying the input tile of pixels into the first stage, wherein the input tile is a tile of an input image frame, wherein the input tile includes Y1 rows of X1 pixels, wherein the input image frame includes Y2 rows of X2 pixels, and wherein X2>X1 and Y2>Y1;
   (c) pipeline processing such that each stage of the image pipeline receives data from a previous stage in the image pipeline and performs processing on the data, wherein one of the stages of the pipeline is a zoom stage that can perform a zoom function;
   (d) writing the output of the last stage of the image pipeline into the memory in the form of an output tile, wherein the input tile and the configuration information are adjusted until the output tile is in a desired location; and
   (e) repeating (a) through (d) such that a plurality of output tiles form an output image frame, wherein some of the output tiles are wider than others of the output tiles, wherein some of the output tiles are taller than others of the output tiles, and wherein some of the output tiles contain more pixels than others of the output tiles.

2. The method of claim 1, wherein the step of image pipeline processing involves the first stage performing a first operation on the first tile of pixels at the same time that the second stage performs a second operation on the second tile of pixels.

3. The method of claim 1, further comprising:
   executing a program on a processor in a camera, wherein execution of the program determines configuration information for each of the stages of the image pipeline for generating each of the output tiles of the output image frame;
   storing the configuration information in a memory; and
   after the pressing of a button on the camera, reading the configuration information from the memory and then using the configuration information to perform steps (a) through (e).

4. The method of claim 1, further comprising:
   determining a location of an autofocus window within the input image frame, wherein the autofocus window defines a region of pixels;
   determining configuration information for configuring each of the stages of the image pipeline for generating each of the output tiles of the output image frame such that all the pixels of the region are output by one of the stages in a single pass through the image pipeline; and
   using the configuration information to perform steps (a) through (e).

5. The method of claim 1, wherein the zoom stage receives zoom stage configuration information, wherein the zoom stage configuration information includes an indication of a phase of an output of the stage.

6. The method of claim 1, wherein the zoom stage receives zoom stage configuration information, wherein the zoom stage configuration information includes an indication of whether a the received by the stage is on an edge of an image frame.

7. The method of claim 1, wherein the first stage outputs to the second stage: a first end of line signal (EOL1), a first start of tile signal (SOT1), a first end of tile signal (EOT1), and a first plurality of data signals (DATA1), and wherein the second stage outputs to a third stage: a second end of line signal (EOL2), a second start of tile signal (SOT2), a second end of tile signal (EOT2), and a second plurality of data signals (DATA2).

8. The method of claim 1, wherein the input tiles that are supplied into the zoom stage from pass to pass through the image pipeline overlap one another.

9. The method of claim 8, wherein the input tiles that are supplied into the zoom stage from pass to pass through the image pipeline have varying numbers of pixels.

10. The method of claim 9, further comprising:
executing a program on a processor, wherein execution of the program determines configuration information for configuring each of the stages of the image pipeline for each of the passes through the image pipeline, wherein the image pipeline and the processor are parts of an integrated circuit.

11. The method of claim 1, wherein an initial output tile that is written into the memory in (d) is located is not adjacent any edge of the output image frame, and wherein the next output tile that is written into the memory in (d) does not touch the initial output tile.

12. A method comprising a processor of a digital camera implementing the following:
(a) choosing an input tile, wherein the input tile is a tile in an input image frame;
(b) determining configuration information for each of a plurality of stages in an image pipeline;
(c) determining a location of an output tile that would be generated by the image pipeline if the image pipeline were used to process the input tile with the stages configured using the configuration information;
(d) determining whether a hardware restriction of a stage in the image pipeline would be broken if the image pipeline were used to process the input tile with the stages configured using the configuration information;
(e) determining whether the output tile is in a desired location in an output image frame;
(f) adjusting the input tile and the configuration information and repeating steps (b) through (e) until it is determined in (e) that the output tile would be in the desired location and until it is determined in (d) that the hardware restriction would not be broken;
(g) storing information that identifies the input tile and storing the configuration information for each of the plurality of stages that results in the output tile being in the desired location and not breaking the hardware restriction; and (h) repeating steps (a) through (g) until information is stored in (g) that identifies a plurality of input tiles, and until information is stored in (g) for how to configure each of the plurality of stages to process each of the identified plurality of tiles.

13. An integrated circuit comprising:
an image pipeline comprising a plurality of stages, wherein the image pipeline generates an output tile corresponding to an input tile of pixels as a result of each pass of a plurality of passes through the image pipeline; and
a processor that determines configuration information for each of the stages and adjusts the input tile and the configuration information until the output tile is in a desired location, wherein the processor also controls the image pipeline such that some of the output tiles are wider than others, such that others of the output tiles are taller than others, and such that still others of the output tiles contain more pixels than others, wherein the output tiles together form an output image frame.

14. The integrated circuit of claim 13, wherein the processor executes a program that generates configuration information for configuring each of the stages of the image pipeline in each of the plurality of passes through the image pipeline.

15. The integrated circuit of claim 14, wherein the integrated circuit is part of a digital camera, wherein the configuration information is stored in a memory, and wherein the integrated circuit reads the configuration information from the memory in response to a shutter button on the digital camera being pressed.

16. The integrated circuit of claim 14, wherein one of the stages of the image pipeline performs a zoom up function.

17. The integrated circuit of claim 14, wherein one of the stages performs an autofocus function.

18. The integrated circuit of claim 14, wherein an initial one of the output tiles is not adjacent any edge of the output image frame, and wherein the next output tile generated by the image pipeline does not touch the initial output tile.

19. The integrated circuit of claim 14, wherein the processor controls the image pipeline such that a particular output tile has a height that can be varied with a granularity of one row of pixels, wherein the particular output, tile has a width that can be varied with a granularity of one column of pixels, and wherein a row/column location of a corner of the particular output tile can be specified by the processor with a granularity of one row of pixels and one column of pixels.

20. The integrated circuit of claim 14, wherein the integrated circuit is part of a digital camera, and wherein the processor generates different configuration information in response to a camera setting of the digital camera being changed.

* * * * *